US012643742B2

(12) United States Patent
Smith

(10) Patent No.: US 12,643,742 B2
(45) Date of Patent: Jun. 2, 2026

(54) LINK FOR A MULTI-LINK CONVEYOR CHAIN

(71) Applicant: Pennine Industrial Equipment Limited, Huddersfield (GB)

(72) Inventor: Christopher Michael McDonald Smith, Huddersfield (GB)

(73) Assignee: PENNINE INDUSTRIAL EQUIPMENT LIMITED, Huddersfield (GB)

( * ) Notice: Subject to any disclaimer, the term of this patent is extended or adjusted under 35 U.S.C. 154(b) by 238 days.

(21) Appl. No.: 18/446,589

(22) Filed: Aug. 9, 2023

(65) Prior Publication Data

US 2024/0051761 A1     Feb. 15, 2024

(30) Foreign Application Priority Data

Aug. 10, 2022    (GB) ..................................... 2211662

(51) Int. Cl.
*B65G 17/08*       (2006.01)
*F16G 15/12*       (2006.01)

(52) U.S. Cl.
CPC ............. *B65G 17/08* (2013.01); *F16G 15/12* (2013.01)

(58) Field of Classification Search
None
See application file for complete search history.

(56) References Cited

U.S. PATENT DOCUMENTS

| | | | | |
|---|---|---|---|---|
| 4,509,937 | A * | 4/1985 | Ledvina | .................... B21L 9/06 474/213 |
| 5,176,586 | A * | 1/1993 | Sugimoto | ............. B21L 15/005 474/212 |
| 5,345,753 | A * | 9/1994 | Okuda | .................... F16G 13/04 474/215 |
| 6,171,209 | B1 * | 1/2001 | Matsuda | ................. F16G 13/04 474/212 |
| 6,435,996 | B2 * | 8/2002 | Horie | ....................... F16G 13/04 474/212 |
| 7,267,222 | B2 * | 9/2007 | Montemartini | ........ B65G 17/40 198/853 |
| 8,312,989 | B2 * | 11/2012 | McCormick | ......... B65G 17/063 198/849 |
| 8,322,522 | B2 * | 12/2012 | Hall | ....................... B65G 17/08 198/853 |
| 8,366,576 | B2 * | 2/2013 | Neutz | ....................... F16G 5/18 206/215 |
| 8,888,632 | B2 * | 11/2014 | Yasuta | ...................... F16H 7/06 474/212 |
| 9,377,082 | B2 * | 6/2016 | Young | ..................... F16H 55/30 |
| 10,358,293 | B2 * | 7/2019 | Womersley | .......... B65G 17/064 |
| 2007/0142150 | A1 * | 6/2007 | Vietoris | .................. F16G 13/04 474/212 |

* cited by examiner

*Primary Examiner* — Kavel Singh
(74) *Attorney, Agent, or Firm* — ARENTFOX SCHIFF LLP

(57)                  ABSTRACT

A toothed link is provided for use in a multi-link conveyor chain. The toothed link includes a link body having a first aperture and a second aperture that are configured to house a first pin and a second pin, respectively; and a top edge. The link body further includes an additional aperture that is positioned closer to the first aperture and the second aperture than to the top edge. The additional aperture is spaced from the first and second apertures by at least 2 mm, and the additional aperture is spaced from the top edge by at least 3 mm.

19 Claims, 12 Drawing Sheets

LINK FOR A MULTI-LINK CONVEYOR CHAIN

CROSS REFERENCE TO RELATED APPLICATION

This application claims priority to GB Patent Application No. 2211662.8, filed Aug. 10, 2022, the disclosure of which is hereby incorporated by reference in its entirety.

FIELD OF INVENTION

The present invention is in the field of links for use in multi-link conveyor chains, conveyor chains, production facilities that make use of conveyor chains, in particular glass manufacturing, and methods of use of the above.

BACKGROUND

There are many fields in which conveyors are used. For example, supermarket check-outs, and manufacturing processes that involve moving goods from one position to another, both use forms of conveyor belts. Each field of use requires a different type of belt. Supermarket check-out belts are often made from polymers. This present application concerns technical fields in which conveyor belts are used that are made from individual links that together form the belt. Such technical fields often include conveyor belts for use in the manufacturing industry.

One particular example is the glass manufacturing industry. As glass is blown it exits a furnace and is often placed on a conveyor belt. Due to the high temperatures (up to 350 degrees Celsius) typically such conveyor belts are formed from metal or other heat resistant materials. The belt is then used to transfer the glass whilst it is cooled.

There are many technical problems associated with the transfer of materials, such as blown glass, during manufacturing processes. For example, the conveyor belt is often heavy due to the material it is formed from—and therefore the energy required to translate the belt is high. Reducing the mass of the belt without compromising its other physical features is one such technical problem. Reducing energy consumption offers both economic and environmental benefits.

Another problem involves the creation of a surface that provides sufficient friction for the goods being carried on the conveyor, whilst the links within the conveyor pivot relative to one another to enable movement of the conveyor belt. The problem is how to maximise the surface area of the top edge of the links without impinging on movement, or increasing weight.

A third problem relates to the usability of the conveyor belt. In manufacturing processes detritus is common. If detritus gets caught in the belt then this may lead to the belt detaching from the sprocket system used to drive it, or worse still lead to damage to the belt, its constituent parts, or the goods atop it. These and other problems may be addressed by the present invention.

SUMMARY OF INVENTION

Aspects of the invention are set out in the independent claims. Optional features are set out in the dependent claims.

In accordance with a first aspect there is provided toothed link for use in a multi-link conveyor chain, the link comprising: a link body; and a top edge. The link body comprises a first aperture and a second aperture, wherein the first and second apertures are configured to house a first and second pin respectively. The toothed link further comprises a further aperture within the link body. The further aperture may advantageously reduce the weight of the link, and so reduce the mass of any conveyor chain/belt formed from the link. Therefore, energy consumption during operation of the conveyor/belt/chain would be reduced.

In another exemplary aspect, the further aperture is positioned in between the first aperture and the second aperture. This may be the position of the further aperture that enables the extent (and therefore associated weight saving) of the further aperture to be maximised, and may allow the link to retain its strength.

In another exemplary aspect, the edge of the further aperture closest the first aperture is curved such that the distance between the further aperture and the first aperture is approximately constant. This may be advantageous as this may minimise the creation of any weak points between the first aperture and the further aperture. This may also maximise the size of the further aperture—this increasing the weight saved.

In another exemplary aspect, the further aperture is positioned closer to the first aperture and/or second aperture than to the top edge. This may be particularly advantageous. This is because the top edge is a weight supporting surface and may therefore experience large forces and wear during use. Therefore, having a larger distance between the top edge and the further aperture increases the strength of the top edge. This also allows the distance between the further aperture and the first/second apertures to be minimised so as to maximise the weight saving of the further aperture.

In another exemplary aspect, said further aperture is spaced from the first and second apertures by a distance that is at least equal to the thickness of the link. This may increase the strength of the link, and improve manufacturability. If the distance between is less than the thickness of the link it has been found that more links are discarded during manufacture, or more expensive manufacturing techniques are required.

In another exemplary aspect, said further aperture is spaced from the first and second apertures and the top edge by at least 1 mm, and optionally at least 2 mm. 2 mm may be advantageous as this is typically the thickness of the link, and allows a great deal of strength in the link to be retained. However, 1 mm may be the minimum that allows the link to retain its minimum strength characteristics and still be readily manufactured (albeit with greater discards during manufacture).

In another exemplary aspect, said further aperture is spaced from the first and second apertures by at least 1 mm and optionally 2 mm, and said further aperture is spaced from the top edge by at least 2 mm, and optionally at least 3 mm. These distances allow the distance between the top edge and the further aperture to be greater than the distance between the further aperture and the first/second apertures. Moreover, it has been found that these distances allow the forces and wear on the top edge, whilst maximising the strength of the link, and the weight saving by the further aperture.

In another exemplary aspect, said further aperture formed by stamping a hole within the link body, alternatively said further aperture is formed by 3D printing, laser cutting, fine blanking, or CNC. Stamping may be a particularly efficient method of manufacture.

In another exemplary aspect, the link body further comprises a first leg and a second leg, the first leg and the second leg connected by a crotch element. This may be advantageous for engaging the conveyor/link with exterior forces.

In another exemplary aspect, the first and second legs are configured to engage with a drive sprocket of a conveyor system. This may allow the conveyor to be driven.

In another exemplary aspect, the first aperture is situated at least partially within the first leg and the second aperture is situated at least partially within the second leg.

In another exemplary aspect, the distance between the further aperture and the top edge is greater than the distance between the further aperture and the crotch element. This may advantageously allow the size of the further aperture to be maximised whilst retaining the strength of the top edge to allow for greater forces and wear experienced by the top edge.

In another exemplary aspect, the distance between the further aperture and the crotch element is the same as the thickness of the link. This may allow for ease of manufacture, and retain the strength of the link whilst minimising its weight.

In another exemplary aspect, the distance between the further aperture and the crotch element is 1 mm, optionally at least 2 mm. 2 mm may be advantageous as this is typically the thickness of the link, and allows a great deal of strength in the link to be retained. However, 1 mm may be the minimum that allows the link to retain its minimum strength characteristics and still be readily manufactured (albeit with greater discards during manufacture).

In another exemplary aspect, the further aperture is a different shape to the first aperture and/or the second aperture. This may allow the area of the further aperture to be maximised—thus reducing weight further.

In another exemplary aspect, the further aperture is approximately oblong.

Particularly for links comprising a crotch this is the shape that allows a maximum area—whilst minimising the loss of strength of the link.

In another exemplary aspect, the top edge is configured to be a weight bearing surface during use.

In another exemplary aspect, the further aperture is at least 5 mm in length when the link comprises a crotch element, and wherein the further aperture is at least 3 mm when the link does not comprise a crotch element. The length is measured in the direction from the first aperture to the second aperture (and so is parallel to the top edge). These lengths may maximise the size of the aperture in both configurations.

In another exemplary aspect, the further aperture is at least 2 mm in when the link comprises a crotch element, or wherein the further aperture is at least 6 mm in depth when the link does not comprise a crotch element. The depth is measured perpendicular to the direction from the first aperture to the second aperture (and so is perpendicular to the top edge). This may maximise the size of the further aperture in both configurations.

In another exemplary aspect, the link is an inverted tooth link. This is the type of link typically used in multi-link conveyor chains/belts.

In another exemplary aspect, the first side and/or second side of the link body are bulbous.

In another exemplary aspect, the edge of the further aperture closest the first aperture is curved such that the curve has the same radius as the curve of the bulbous second side of the link body. This may be highly advantageous during use. This is because it may prevent overlap of the further aperture of one link by the bulbous side of another adjacent link. As the links pivot relative to one another during use the further aperture would otherwise be overlapped. Minimising any overlap reduces the risk of damage to the link.

In another exemplary aspect, the corners of the further aperture are curved so as to avoid vertices. This may increase the strength of the link, and reduce detritus that gets caught in the further aperture.

In another exemplary aspect, the link body is connected to the top edge via a raised lip. This may increase the contact surface of the top edge, and thus increase friction on items standing on the link.

In another exemplary aspect, the raised lip connects the bulbous sides with the top edge.

In another exemplary aspect, the curvature of at least one corner of the further aperture has a radius equal to the radius of the raised lip joining the bulbous side to the top edge, optionally wherein said at least one corner is one or both of the top two corners nearest the top edge. This may be highly advantageous during use. This is because it may prevent overlap of the further aperture of one link by the radius of the raised link of another adjacent link. As the links pivot relative to one another during use the further aperture would otherwise be overlapped. Minimising any overlap reduces the risk of damage to the link during use.

In another exemplary aspect, the raised lip comprises an angle of 90 degrees or over to connect the bulbous sides with the top edge. An angle of over 90 degrees may be advantageous for reducing any vertices and so making manufacture simpler.

In another exemplary aspect, the raised lip is at least 1 mm in depth. This depth allows the contact surface to be increased—whilst also increasing the lifespan of a link, as the top edge may wear down further before it needs to be replaced.

In another exemplary aspect, the raised lip increases the contact surface of the top edge by at least 5%, and optionally 8%.

In another exemplary aspect, the link is substantially planar.

In another exemplary aspect, the first aperture is partially located within the bulbous first side.

In another exemplary aspect, the second aperture is partially located within the bulbous second side.

In another exemplary aspect, the first aperture extends more proximally than the proximal end of the top edge.

In another exemplary aspect, the second aperture extends more distally than the distal end of the top edge.

In another exemplary aspect, the first and second apertures are shaped to have a cross section that is approximately ovoid so as to be configured for use with a single pin.

In another exemplary aspect, the first and second apertures are shaped to be approximately circular with a missing chord, so as to be configured for use with two pins in each aperture.

In another exemplary aspect, the flat surface of the circle with a missing chord faces the bulbous side.

In another exemplary aspect, the link is formed from metal, for example steel, stainless steel or carbon steel.

In accordance with a second exemplary aspect there is provided a toothed link for use in a multi-link conveyor chain, the link comprising a link body; and a top edge. In this aspect, the link body comprises a first aperture and a second aperture, wherein the first and second apertures are configured to house a first and second pin respectively. Moreover, the link body is connected to the top edge via a raised lip. This may increase the contact surface of the top edge, and thus increase friction on items standing on the link.

In another exemplary aspect, the raised lip connects the bulbous sides with the top edge.

In another exemplary aspect, the curvature of at least one corner of the further aperture has a radius equal to the radius of the raised lip joining the bulbous side to the top edge, optionally wherein said at least one corner is one or both of the top two corners nearest the top edge. This may be highly advantageous during use. This is because it may prevent overlap of the further aperture of one link by the radius of the raised link of another adjacent link. As the links pivot relative to one another during use the further aperture would otherwise be overlapped. Minimising any overlap reduces the risk of damage to the link during use.

In another exemplary aspect, the raised lip comprises an angle of 90 degrees or over to connect the bulbous sides with the top edge. An angle of over 90 degrees may be advantageous for reducing any vertices and so making manufacture simpler.

In another exemplary aspect, the raised lip is at least 1 mm in depth. This depth allows the contact surface to be increased—whilst also increasing the lifespan of a link, as the top edge may wear down further before it needs to be replaced.

In another exemplary aspect, the raised lip increases the contact surface of the top edge by at least 5%, and optionally 8%.

In another exemplary aspect, a further aperture is provided within the link body. The further aperture may advantageously reduce the weight of the link, and so reduce the mass of any conveyor chain/belt formed from the link. Therefore, energy consumption would be reduced.

In another exemplary aspect, the further aperture is positioned in between the first aperture and the second aperture. This may be the position of the further aperture that enables the extent (and therefore associated weight saving) of the further aperture to be maximised, and may allow the link to retain its strength.

In another exemplary aspect, the edge of the further aperture closest the first aperture is curved such that the distance between the further aperture and the first aperture is approximately constant. This may be advantageous as this may minimise the creation of any weak points between the first aperture and the further aperture. This may also maximise the size of the further aperture—this increasing the weight saved.

In another exemplary aspect, the further aperture is positioned closer to the first aperture and/or second aperture than to the top edge. This may be particularly advantageous. This is because the top edge is a weight supporting surface and may therefore experience large forces and wear during use. Therefore, having a larger distance between the top edge and the further aperture increases the strength of the top edge. This also allows the distance between the further aperture and the first/second apertures to be minimised so as to maximise the weight saving of the further aperture.

In another exemplary aspect, said further aperture is spaced from the first and second apertures by a distance that is at least equal to the thickness of the link. This may increase the strength of the link, and improve manufacturability. If the distance between is less than the thickness of the link it has been found that more links are discarded during manufacture, or more expensive manufacturing techniques are required.

In another exemplary aspect, said further aperture is spaced from the first and second apertures and the top edge by at least 1 mm, and optionally at least 2 mm. 2 mm may be advantageous as this is typically the thickness of the link, and allows a great deal of strength in the link to be retained. However, 1 mm may be the minimum that allows the link to retain its minimum strength characteristics and still be readily manufactured (albeit with greater discards during manufacture).

In another exemplary aspect, said further aperture is spaced from the first and second apertures by at least 1 mm and optionally 2 mm, and said further aperture is spaced from the top edge by at least 2 mm, and optionally at least 3 mm. These distances allow the distance between the top edge and the further aperture to be greater than the distance between the further aperture and the first/second apertures. Moreover, it has been found that these distances allow the forces and wear on the top edge, whilst maximising the strength of the link, and the weight saving by the further aperture.

In another exemplary aspect, said further aperture formed by stamping a hole within the link body, alternatively said further aperture is formed by 3D printing, laser cutting, fine blanking, or CNC. Stamping may be a particularly efficient method of manufacture.

In another exemplary aspect, the link body further comprises a first leg and a second leg, the first leg and the second leg connected by a crotch element. This may be advantageous for engaging the conveyor/link with exterior forces.

In another exemplary aspect, the first and second legs are configured to engage with a drive sprocket of a conveyor system. This may allow the conveyor to be driven.

In another exemplary aspect, the first aperture is situated at least partially within the first leg and the second aperture is situated at least partially within the second leg.

In another exemplary aspect, the distance between the further aperture and the top edge is greater than the distance between the further aperture and the crotch element. This may advantageously allow the size of the further aperture to be maximised whilst retaining the strength of the top edge to allow for greater forces and wear experienced by the top edge.

In another exemplary aspect, the distance between the further aperture and the crotch element is the same as the thickness of the link. This may allow for ease of manufacture, and retain the strength of the link whilst minimising its weight.

In another exemplary aspect, the distance between the further aperture and the crotch element is 1 mm, optionally at least 2 mm. 2 mm may be advantageous as this is typically the thickness of the link, and allows a great deal of strength in the link to be retained. However, 1 mm may be the minimum that allows the link to retain its minimum strength characteristics and still be readily manufactured (albeit with greater discards during manufacture).

In another exemplary aspect, the further aperture is a different shape to the first aperture and/or the second aperture. This may allow the area of the further aperture to be maximised—thus reducing weight further.

In another exemplary aspect, the further aperture is approximately oblong. Particularly for links comprising a crotch this is the shape that allows a maximum area—whilst minimising the loss of strength of the link.

In another exemplary aspect, the top edge is configured to be a weight bearing surface during use.

In another exemplary aspect, the further aperture is at least 5 mm in length when the link comprises a crotch element, and wherein the further aperture is at least 3 mm when the link does not comprise a crotch element. The length is measured in the direction from the first aperture to the second aperture (and so is parallel to the top edge). These lengths may maximise the size of the aperture in both configurations.

In another exemplary aspect, the further aperture is at least 2 mm in when the link comprises a crotch element, or wherein the further aperture is at least 6 mm in depth when the link does not comprise a crotch element. The depth is measured perpendicular to the direction from the first aperture to the second aperture (and so is perpendicular to the top edge). This may maximise the size of the further aperture in both configurations.

In another exemplary aspect, the link is an inverted tooth link. This is the type of link typically used in multi-link conveyor chains/belts.

In another exemplary aspect, the first side and/or the second side of the link body are bulbous.

In another exemplary aspect, the edge of the further aperture closest the first aperture is curved such that the curve has the same radius as the curve of the bulbous second side of the link body. This may be highly advantageous during use. This is because it may prevent overlap of the further aperture of one link by the bulbous side of another adjacent link. As the links pivot relative to one another during use the further aperture would otherwise be overlapped. Minimising any overlap reduces the risk of damage to the link.

In another exemplary aspect, the corners of the further aperture are curved so as to avoid vertices. This may increase the strength of the link, and reduce detritus that gets caught in the further aperture.

In another exemplary aspect, the link is substantially planar.

In another exemplary aspect, the first aperture is partially located within the bulbous first side.

In another exemplary aspect, the second aperture is partially located within the bulbous second side.

In another exemplary aspect, the first aperture extends more proximally than the proximal end of the top edge.

In another exemplary aspect, the second aperture extends more distally than the distal end of the top edge.

In another exemplary aspect, the first and second apertures are shaped to have a cross section that is approximately ovoid so as to be configured for use with a single pin.

In another exemplary aspect, the first and second apertures are shaped to be approximately circular with a missing chord, so as to be configured for use with two pins in each aperture.

In another exemplary aspect, the flat surface of the circle with a missing chord faces the bulbous side.

In another exemplary aspect, the link is formed from metal, for example steel, stainless steel or carbon steel.

In accordance with a third exemplary aspect there is provided multi-link conveyor chain comprising at least two pins in parallel with one another. In this aspect, the first pin protrudes through a first aperture of a first link; the second pin protrudes through a second aperture of the first link; the first pin protrudes through a second aperture of a second link; the second pin protrudes through a first aperture of a third link; the second link and third link are adjacent one another; the first pin protrudes through a first aperture of a fourth link; the second pin protrudes through a second aperture of the fourth link; the second link and third link are located between the first link and the fourth link; at least one of the first, second, third or fourth links comprise a link in accordance with the preceding aspects. Therefore, the chain may be either more energy efficient, or provides greater friction to an object sitting atop it.

In another exemplary aspect, the multi-link conveyor chain further comprises front and end plates situated at either end of the pins.

In another exemplary aspect, at least one of the first and/or second pins comprises a pair of pins.

In another exemplary aspect, the multi-link conveyor chain further comprises further pins and links to create a two-dimensional meshed belt.

In another exemplary aspect, the first link and second link are configured to pivot relative to one another about the first pin.

In another exemplary aspect, when pivoted relative to one another, the bulbous side of the first side of the first link does not overlap the further aperture of the second link. This may be highly advantageous during use. Detritus can be common during manufacture processes (especially during glass production) and so detritus may get stuck within the further aperture. By not overlapping the further aperture damage to the links and chain/belt can be minimised or even avoided.

In another exemplary aspect, when pivoted relative to one another, the raised lip connecting the first bulbous side to the top edge of the first link does not overlap the further aperture of the second link. Detritus can be common during manufacture processes (especially during glass production) and so detritus may get stuck within the further aperture. By not overlapping the further aperture damage to the links and chain/belt can be minimised or even avoided.

In another exemplary aspect, the distance between the first pin and the second pin is 0.5 inches. There are several length of pitches available. Typically, they are either 0.5 inch or 1 inch. A 1-inch chain may be used to reduce weight—but this has other downsides such as being less flexible. This 0.5-inch weight reduced chain is therefore highly advantageous.

In another exemplary aspect, the further pins and links are organised in the same pattern as set out in the second aspect.

In another exemplary aspect, the pins are capped and/or welded at their ends.

In another exemplary aspect, the chain is for use in the glass production industry.

In accordance with a fourth exemplary aspect there is provided a use of the multi-link conveyor of the third aspect. In this aspect, the use or method includes providing a force to translate a portion of the conveyor; said translation causing the first link and the second link to pivot relative to one another about the first pin. Moreover, no portion of the first link overlaps the further aperture of the second link, and no portion of the second link overlaps the further aperture of the first link. Detritus can be common during manufacture processes (especially during glass production) and so detritus may get stuck within the further aperture. By not overlapping the further aperture damage to the links and chain/belt can be minimised or even avoided.

In accordance with a fifth exemplary aspect, a conveying system is provided comprising the multi-link conveyor chain of the third aspect.

In another exemplary aspect, the conveying system is a portion of a glass production system.

BRIEF DESCRIPTION OF FIGURES

In FIG. 9 the links are parallel with one another.

In FIG. 10 the links are pivoted such that the right-most link is rotated clockwise about the common aperture.

In FIG. 11 the links are pivoted such that the right-most link is rotated anti-clockwise about the common aperture.

DETAILED DESCRIPTION

There is described herein a toothed link for use in a multi-link conveyor chain, the link comprising a link body, and a top edge, wherein the link body comprises a first aperture and a second aperture, wherein the first and second apertures are configured to house a first and second pin respectively, further comprising a further aperture within the link body.

There is further described a toothed link for use in a multi-link conveyor chain, the link comprising a link body, and a top edge, wherein the link body comprises a first aperture and a second aperture, wherein the first and second apertures are configured to house a first and second pin respectively, wherein the link body is connected to the top edge via a raised lip.

Figure 1:
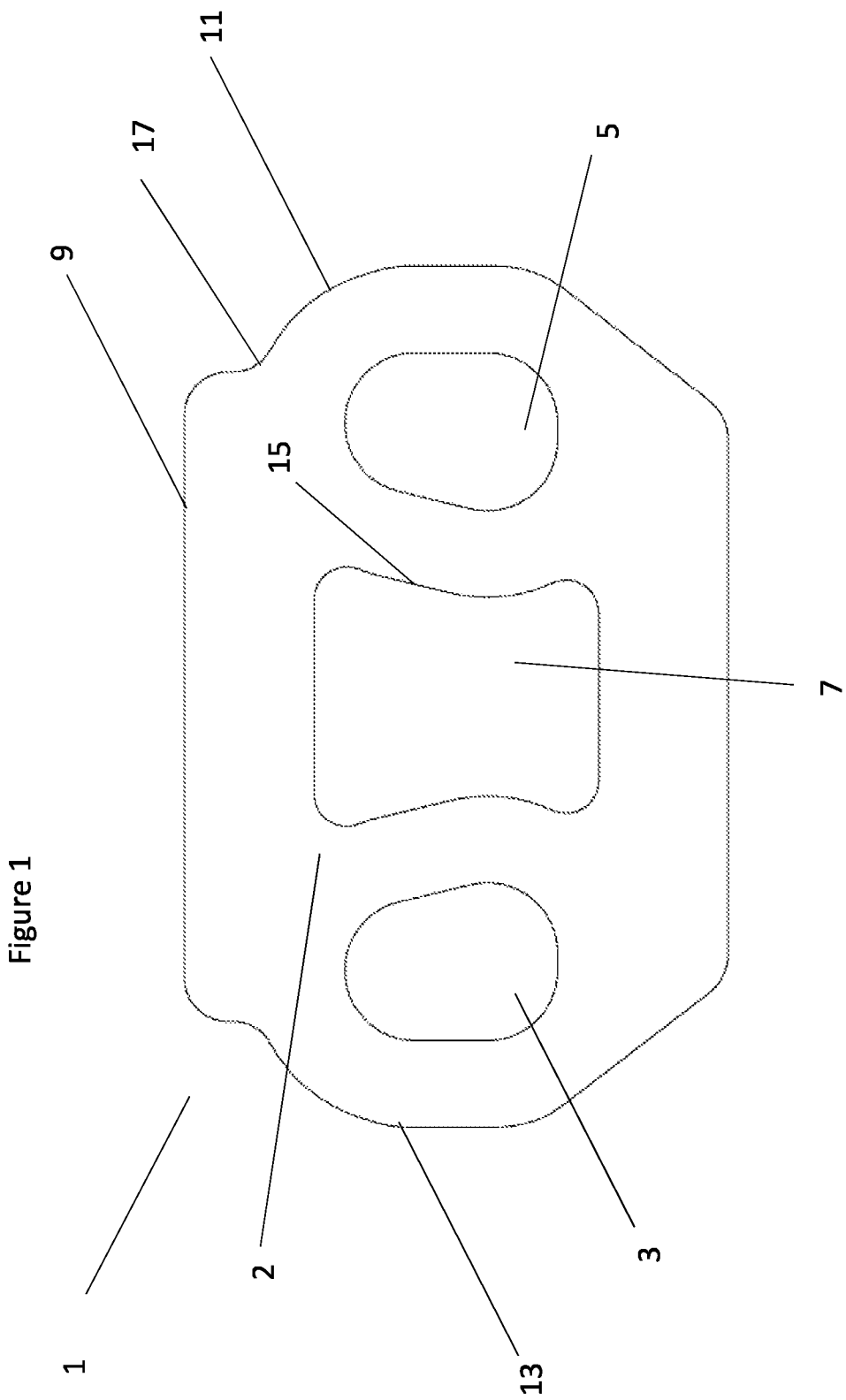
FIG. 1 shows a cross sectional view of a link according to a first embodiment comprising a first aperture a second aperture and a further aperture with a top edge. The link shown is configured for use with a single pin in each aperture.

FIG. 1 shows a cross sectional view of a link comprising a first aperture a second aperture and a further aperture (i.e., an additional aperture) with a top edge. The link shown is configured for use with a single pin in each aperture.

The link 1 of FIG. 1 may be known as a guide link. This means that the top edge 9 and the bottom edge are approximately parallel. This contrasts with the links shown in FIG. 5-8 which show links characterised as plain links. Conveyor chains/belts formed from links may be constructed from either guide links or plain links, or more commonly from a combination of both types of link. Typically, plain links are used to engage sprockets, whilst guide links form the remainder of the conveyor/belt/chain.

FIG. 1 shows a link 1 formed from a link body 2, the link body 2 comprising a first aperture 3, a second aperture 5, and a further aperture 7. The link 1 further comprises a top edge 9. Also shown in FIG. 1 are first side 13 and second side 11. The second side 11 connects to the top edge 9 by a raised lip 17. This is mirrored on the first side 13 of the link 1. The further aperture comprises an edge 15 which is also shown. The sides 11 and 13 may be bulbous in shape.

The first aperture 3 and the second aperture 5 are both configured for use in this embodiment with a single pin. That means each aperture receives just one pin. In alternative embodiments (as shown in FIGS. 3, 4, 5 and 6) two-pin apertures may be used. The first aperture 3 and the second aperture 5 are approximately ovoid. This may roughly correspond to the cross section of the pins that pass through the apertures 3, 5. There may be some clearance about the pins once inserted within the apertures 3, 5.

It is noted that the further aperture 7 is configured to reduce the weight of the link. This will therefore reduce the weight of any conveyor/belt that the link forms part of. As the conveyor/belts can be heavy they require a great deal of energy to use. Therefore, by reducing the weight of the links that comprise the conveyor/belt the amount of energy required is reduced. This mass reduction therefore makes the energy requirement less which is beneficial both economically and environmentally.

In this embodiment the distance between the further aperture 7 and the top edge 9 is greater than the distance between the further aperture 7 and the first aperture 3 and the second aperture 5. The top edge 9 is weight bearing during use. This means that the forces that are exerted on top edge 9 may be greater than the forces experienced by other parts of the link 1. Moreover, the top edge 9 may experience a degree of wear during use as a result of these forces. Lengthening the distance between the further aperture 7 and the top edge 9 therefore may strengthen the top edge 9 and so make it resilient to larger forces and also extend the lifespan of the link by increasing the amount of wear that the top edge 9 may experience.

In this example the distance between the first aperture/ second aperture 3/5 and the further aperture 7 is the same as the thickness of the link 1. The further aperture 7 is in this embodiment positioned between the first aperture 3 and the second aperture 5. The thickness of the link 1 may in some embodiments be 1 mm, although it may advantageously be 2 mm (as per this embodiment) to simplify manufacture. The distance between the further aperture 7 and the top edge 9 in this example is 3 mm. This may be reduced to 2 mm in some embodiments where the distance between the further aperture and the first aperture is also reduced.

The distance between the first and the second apertures may be half an inch, or an inch, as these are industry standards. However, in this embodiment half an inch is used. Chains that use links with a 1 inch gap between apertures typically weigh less—but have other drawbacks such as having faster wear rates. This embodiment creates a 0.5 inch link for use in a chain that creates a 0.5 inch chain with reduced weight. This therefore mitigates the negatives of a 1 inch chain.

The further aperture is shaped so that the distance between the further aperture 7 and the nearest edge is approximately constant. For example, the top edge of the further aperture 7 is straight so that it is parallel to the top edge 9. This means that the top edge 9 and the top edge of the further aperture 7 remain the same distance apart across the length of the further aperture 7. The edge of the further aperture labelled 15 is adjacent the second aperture 5. The edge 15 is shaped to have a constant distance between the edge 15 and the second aperture 5. The second aperture 5 is approximately ovoid. In this particular example the edge closest to the further aperture 7 comprises a straight section and a curved section. The edge 15 therefore similarly comprises said sections. It is noted that the edge of the further aperture 7 closest to the first aperture similarly runs parallel to the first aperture 3.

The further aperture 7 and the shape of the bulbous sides 11, 13 also correspond in shape. In particular, the approximate radius, and/or shape of the bulbous sides 11, 13 and the edges of the further aperture are approximately the same. This means that when links are adjacent to one another within a chain the further aperture is not overlapped by a bulbous side whilst one or both of the links pivot. If the central aperture is overlapped, then this could cause damage to the system. This is because detritus can be caught within the further aperture. Whilst most detritus will be loose, or will fall out some may be difficult to dislodge and any overlap may cause the link to become damaged, for the chain to become damaged, or for the chain to detach from the sprocket.

The further aperture in this embodiment may be at least 3 mm in length and 6 mm in depth.

The top edge 9 is raised from the link body 2 by a raised lip 17. This joins the top edge 9 to the bulbous sides 11. The raised lip 17 may be complimentary to the further aperture 7 as it increases the distance from the further aperture 7 to the top edge 9 without increasing the weight of the link 1.

It is also noted that the proximal end of the first aperture 3 may be more proximal than the proximal end of the top edge 9. The distal end of the second aperture 5 may also be more distal than the distal end of the top edge 9.

Moreover, the raised lip may in and of itself (even if the further aperture was removed) be beneficial. This is because the use of the raised lip increases the effective surface area of the top edge 9 of the link 1. An increased surface area means that for uses where increased frictional force is a benefit there is more surface interacting with an object placed on the link/conveyor/belt. This therefore reduces the chance of slippage occurring. For uses where a finite amount of friction is needed this surface area can be reduced in other ways (such as introducing castellation). The surface area may be increased by the use of the raised lip 17 by at least 5% and potentially up to 8% or even more. This is highly beneficial in the glass industry as simpler glass patterns may be blown that do not add as many frictional grooves on the base.

The raised lip 17 is implemented in this embodiment by a fillet creating an angle of approximately 130 degrees between the top edge and the bulbous side 11. In practice any angle of 90 degrees or over may be utilised. However, an angle over 90 degrees may be beneficial to prevent vertices which are more difficult to manufacture. A greater angle of 105 degrees or over may again make manufacture simpler as less links are likely to be discarded during manufacture.

Figure 2:
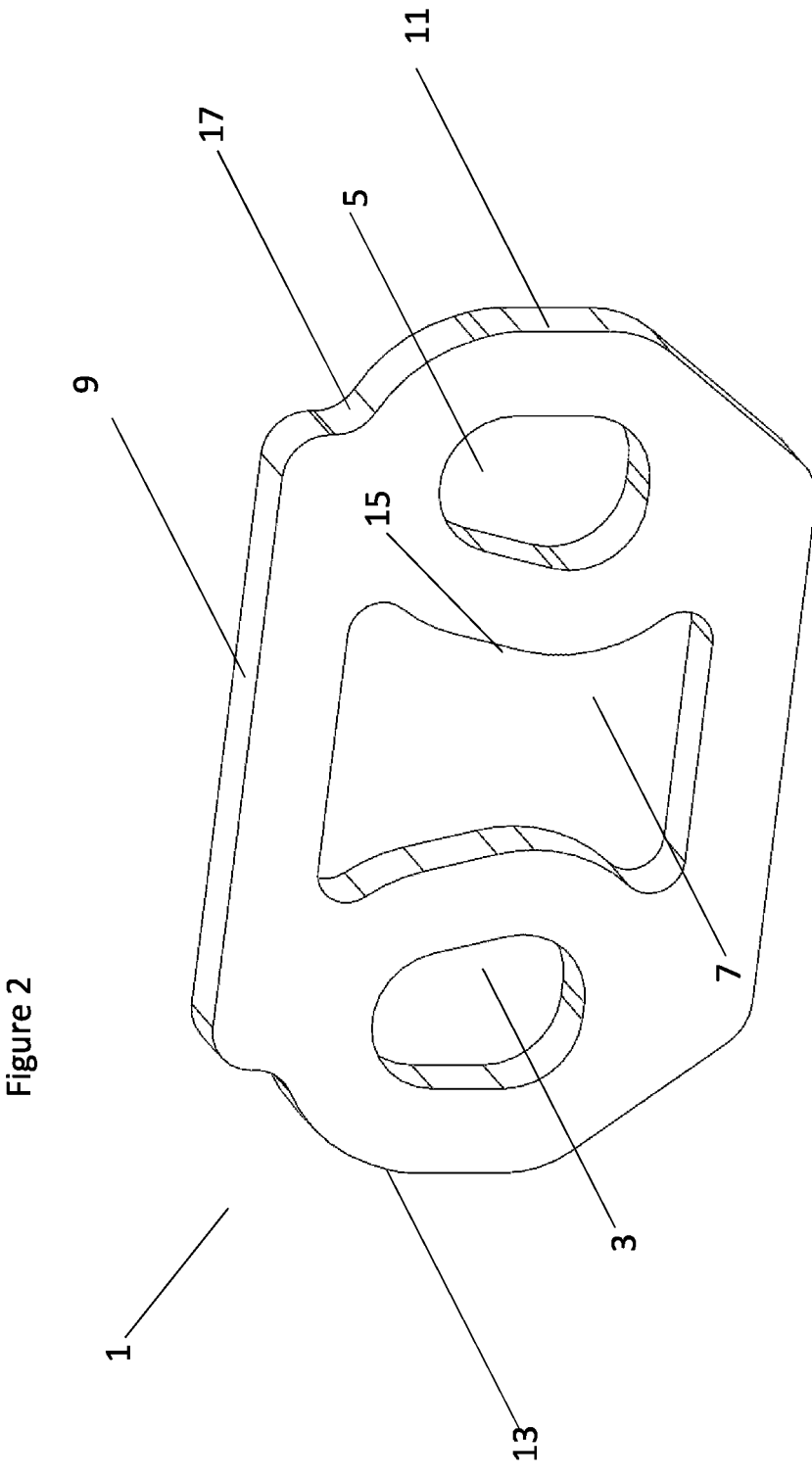
FIG. 2 shows a perspective view of the link of the first embodiment comprising a first aperture a second aperture and a further aperture with a top edge. The link shown is configured for use with a single pin in each aperture.

FIG. 2 shows a perspective view of the link of FIG. 1 comprising a first aperture a second aperture and a further aperture with a top edge. The link shown is configured for use with a single pin in each aperture. FIG. 2 shows a link 1 formed from a link body 2, the link body 2 comprising a first aperture 3, a second aperture 5, and a further aperture 7. The link 1 further comprises a top edge 9. Also shown in FIG. 2 are first side 13 and second side 11. The second side 11 connects to the top edge 9 by a raised lip 17. This is mirrored on the first side 13 of the link 1. The further aperture comprises an edge 15 which is also shown. The sides 11 and 13 may be bulbous in shape.

This viewpoint shows that the link 1 is planar. In this example the width of the link 1 is 1.5 mm. It is common for single pin links to be 1.5 mm in width, and for double pin links to be 2 mm in width (both embodiments may have thicknesses within the range 1.5 mm-2 mm). However in other embodiments this width may be as low as 1 mm. This reduction in width however may make manufacture more difficult and/or costly.

The link 1 may be manufactured in any suitable manner. However, the simplest and most cost effective may be stamping. Alternate methods of production include 3D printing, laser cutting, CNC, fine blanking and the like.

In this example the link is made from metal. In particular, the link may be made from steel, carbon steel, or stainless steel.

Figure 3:
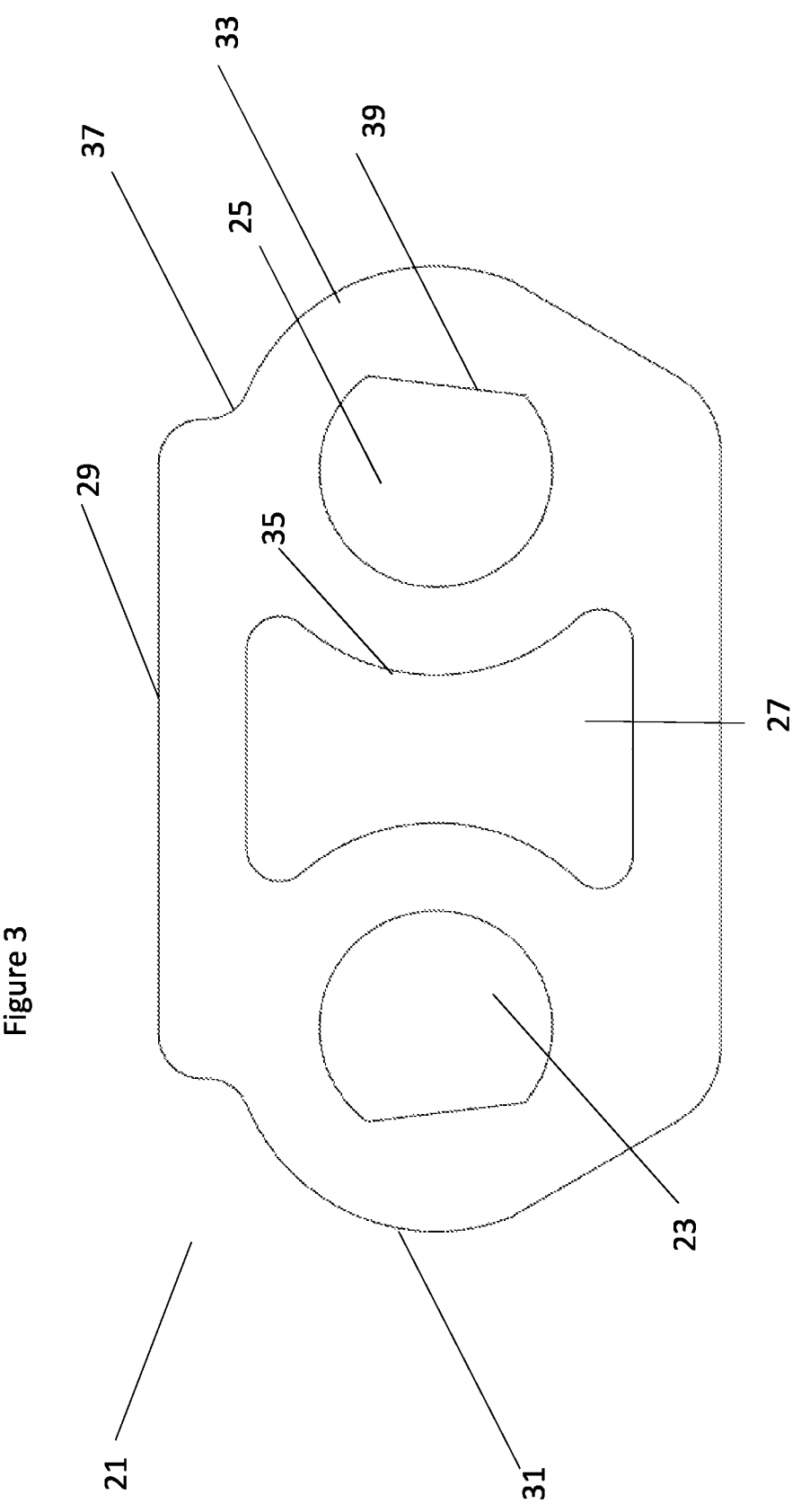
FIG. 3 shows a cross sectional view of a link according to a second embodiment comprising a first aperture a second aperture and a further aperture with a top edge. The link shown is configured for use with a double pin in each aperture.

FIG. 3 shows a cross sectional view of a link comprising a first aperture a second aperture and a further aperture with a top edge. The link shown is configured for use with a double pin in each aperture. The link of FIG. 3 is identical to the link of FIGS. 1 and 2, with exception of the shapes of the first aperture 23, second aperture 25 and further aperture 27. The description of this link is limited to these shapes as the remaining details are described with reference to FIG. 1.

The first aperture 23 is shaped to be substantially circular, but with a missing segment along a chord of the circle. The chord is positioned adjacent to the bulbous first edge 31. Similarly, the chord 39 of the second aperture 25 is positioned adjacent the second bulbous side 33. The first and second apertures 23, 25 are so shaped to enable two pins to pass through each of the apertures. Depending on the use conveyor belts/chains are constructed with either one pin or two pins through each link. This embodiment focusses on uses for two pin chains.

Similar to the embodiment of FIGS. 1 and 2, the further aperture 27 is shaped to have a constant distance to the first aperture 23 and the second aperture 25. In this case this means that the further aperture 27 has a circular radius on its first side and second side 35. The centre of the second aperture 25 is the same centre as the centre of the circle that would be formed if the edge 35 was extended to form a full circle. The radius of edge 35 is greater than the radius of the second aperture 25 by the distance between the second aperture 25 and the further aperture 27, in this case 2 mm.

The radius of the bulbous edge is the same as the radius of the edge of the further aperture. For example, the radius of the curve of bulbous second side 33 is the same as the radius of the edge 35 of the further aperture 27. Indeed, if the edge 35 was extended it would conjoin with the radius of bulbous side 33 to form a circle. This is the same for the first bulbous side 31 and the side of the further aperture adjacent the bulbous side. These features ensure that there is no overlap of the further aperture by the bulbous side during use.

Figure 4:
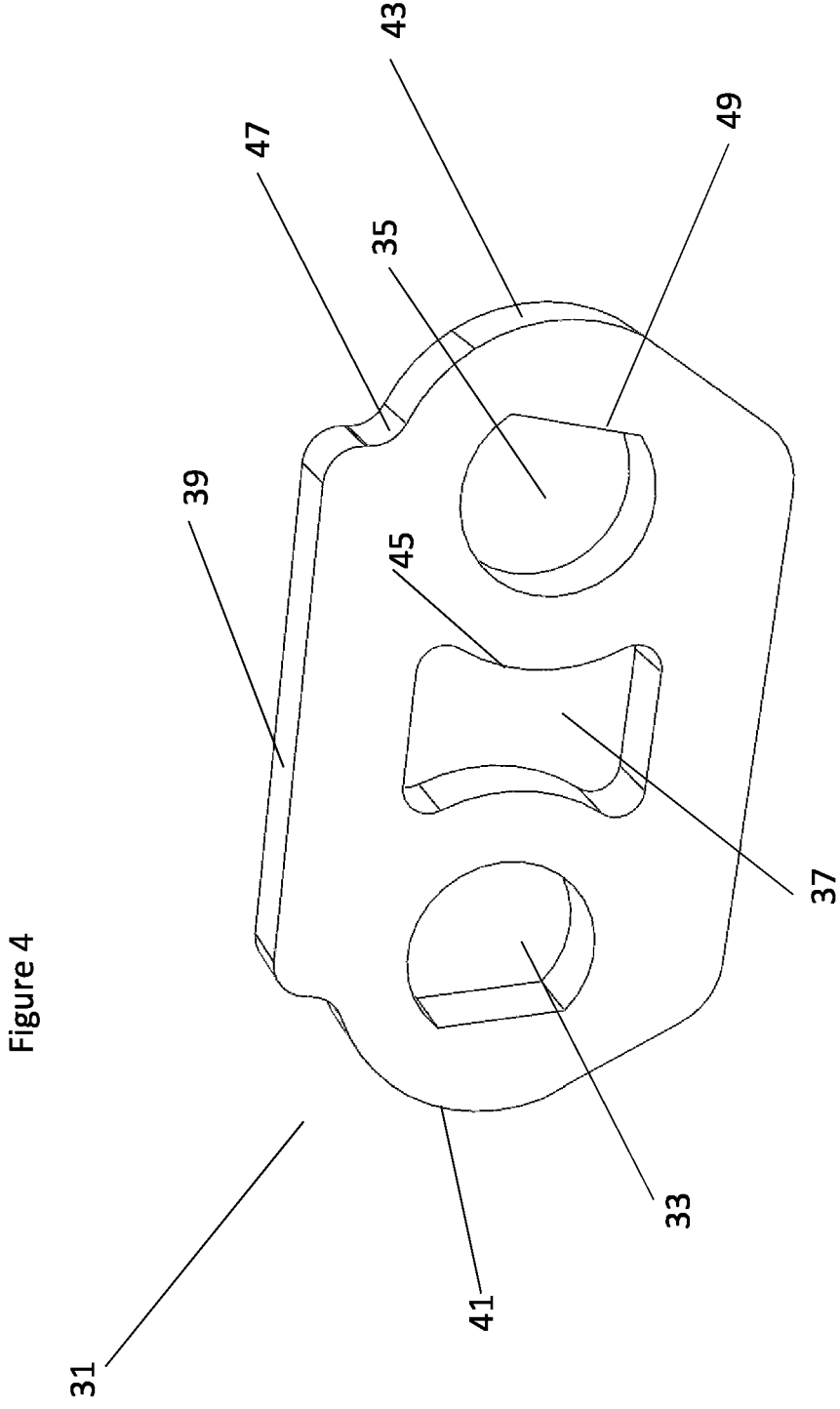
FIG. 4 shows a perspective view of the link of the second embodiment comprising a first aperture a second aperture and a further aperture with a top edge. The link shown is configured for use with a double pin in each aperture.

FIG. 4 shows a perspective view of a link comprising a first aperture a second aperture and a further aperture with a top edge. The link shown is configured for use with a double pin in each aperture. FIG. 4 is consistent with FIG. 3.

Figure 5:
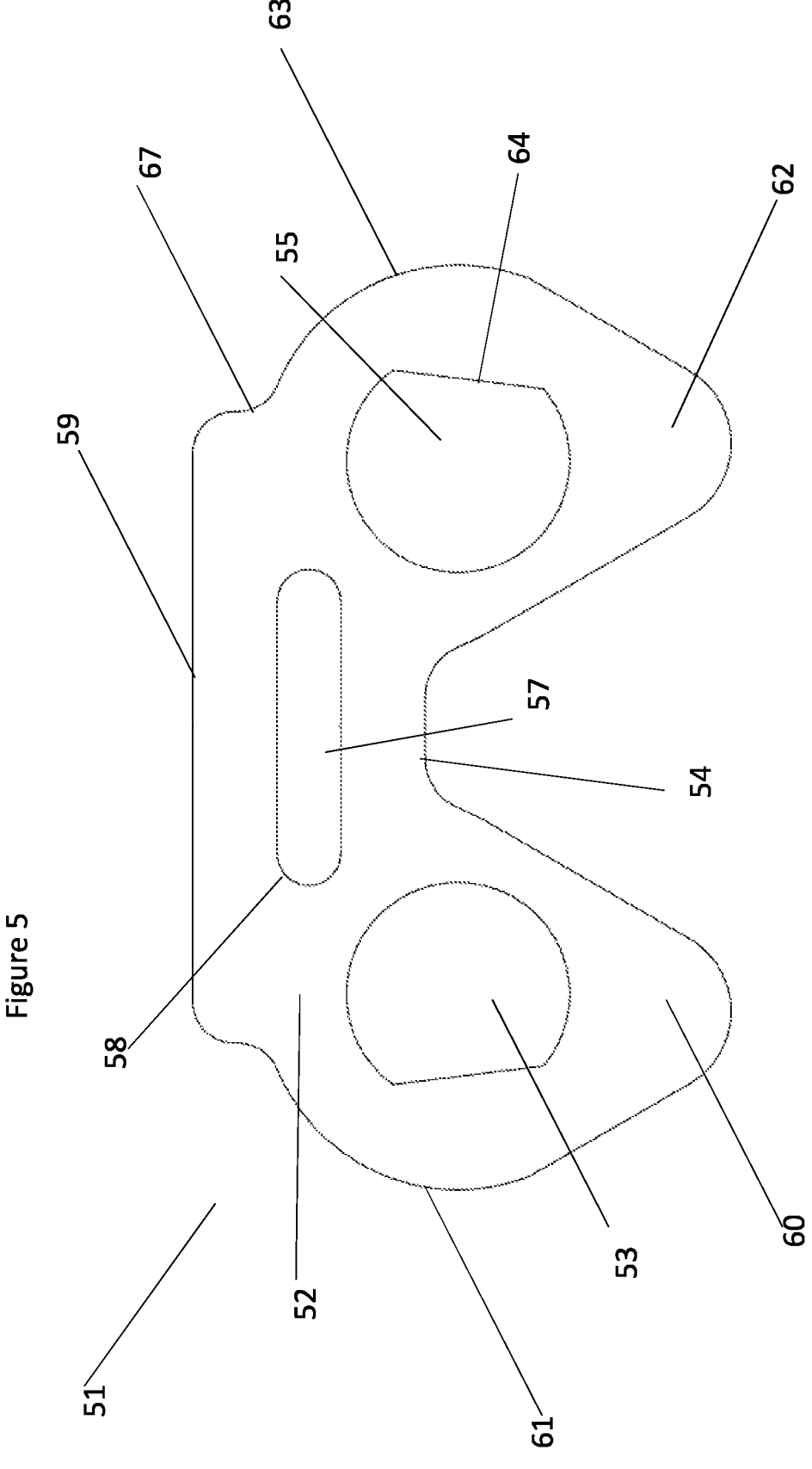
FIG. 5 shows a cross sectional view of a link according to a third embodiment comprising a first aperture, a second aperture, and a further aperture, and a crotch element, with a top edge. The link shown is configured for use with a double pin in each aperture.

FIG. 5 shows a cross sectional view of a link comprising a first aperture, a second aperture, and a further aperture, and a crotch element, with a top edge. The link shown is configured for use with a double pin in each aperture. The link shown is a toothed link. In this particular embodiment an inverted toothed link is shown. The link in this embodiment is known as a plain link. As compared to the embodiment shown in FIGS. 3 and 4 this embodiment differs in that a crotch 54 is used, and the shape of the further aperture 57 is different. The other features are identical to FIG. 3 and so the description of FIG. 3 (and by further reference to FIGS. 1 and 2 for other common features) is used for reference.

The link body 52 of the link 51 comprises a first leg 60 and a second leg 62. The first leg 60 and the second leg 62 are joined together by a crotch element. In use the legs 60, 62 of the link 51 engage a sprocket so that the conveyor belt may be driven in this manner. The first aperture 53 is at least partially within the first leg 60, and the second aperture 55 is at least partially within the second leg 62. The first aperture 53 and second aperture 55 are shaped the same as the embodiment shown in FIGS. 3 and 5.

The further aperture 57 is shaped differently to the guide link embodiments of FIGS. 1-4. In particular, the further aperture 57 is oblong. In this embodiment the further aperture 57 comprises curved corners so that there are no vertices present. This may make manufacture simpler and reduce the amount of links discarded in manufacture. The closest point of the further aperture to the first aperture 53 and the second aperture 57 is again the thickness of the link, which in this embodiment is 2 mm. The further aperture 57 is also further from the top edge 59 that the further aperture 57 is from the first aperture 53 and/or the second aperture 55. The further aperture is further from the top edge 59 than the further aperture 57 is from the crotch 54. In this embodiment the further aperture is distanced from the crotch 54 by the approximately same distance as the thickness of the link 51. In this case that thickness is 2 mm. The distance between the crotch element 54 and the further aperture 57 is 1.5 mm in this example. The crotch element 54 may the closest edge to the further aperture 57. This maximises the size of the further aperture 57 whilst making the link simple to manufacture, and whilst keeping the strength of the link. The further aperture may measure approximately 5 mm in length, and 2 mm in depth.

The radius of the raised lip 67 is configured in some embodiments to match the radius of the corners 58 of the further aperture. This means that as the links 51 pivot relative to one another in a conveyor chain/belt during use the amount of overlap between an adjacent pin and a further aperture 57 is minimised or prohibited entirely. This minimises the chance of damage to the chain, link or objects situated on the chain, as overlapping elements may cause interaction with any debris within the further aperture 57. It is noted that in some embodiments there is some tolerance of a certain amount of overlap, but that reducing this overlap is nonetheless preferable.

Figure 6:
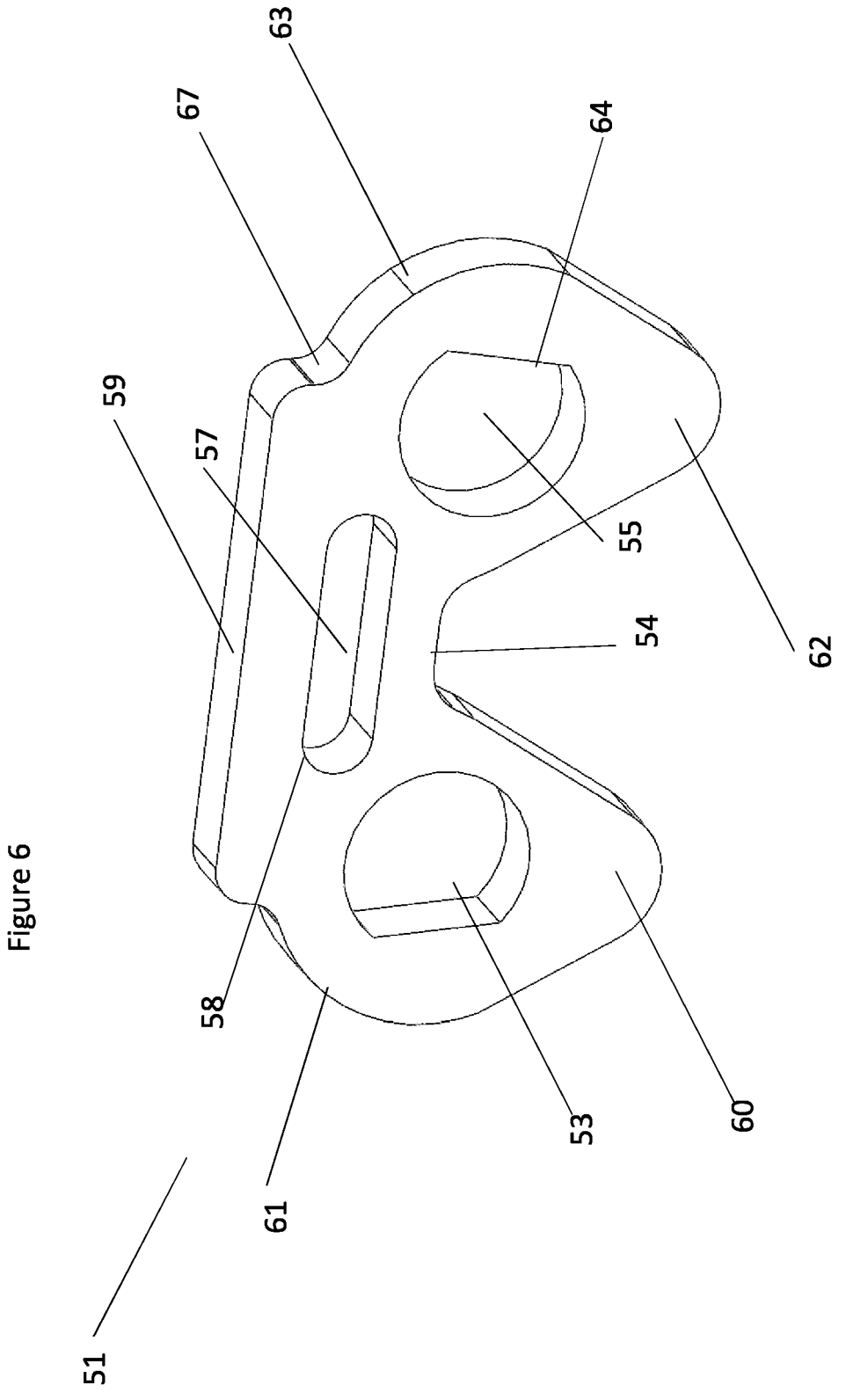
FIG. 6 shows a perspective view of the link of the third embodiment comprising a first aperture, a second aperture, and a further aperture, and a crotch element, with a top edge. The link shown is configured for use with a double pin in each aperture.

FIG. 6 shows a perspective view of the link of FIG. 5 comprising a first aperture, a second aperture, and a further aperture, and a crotch element, with a top edge. The link shown is configured for use with a double pin in each aperture. FIG. 6 is entirely consistent with the features shown in FIG. 5.

Figure 7:
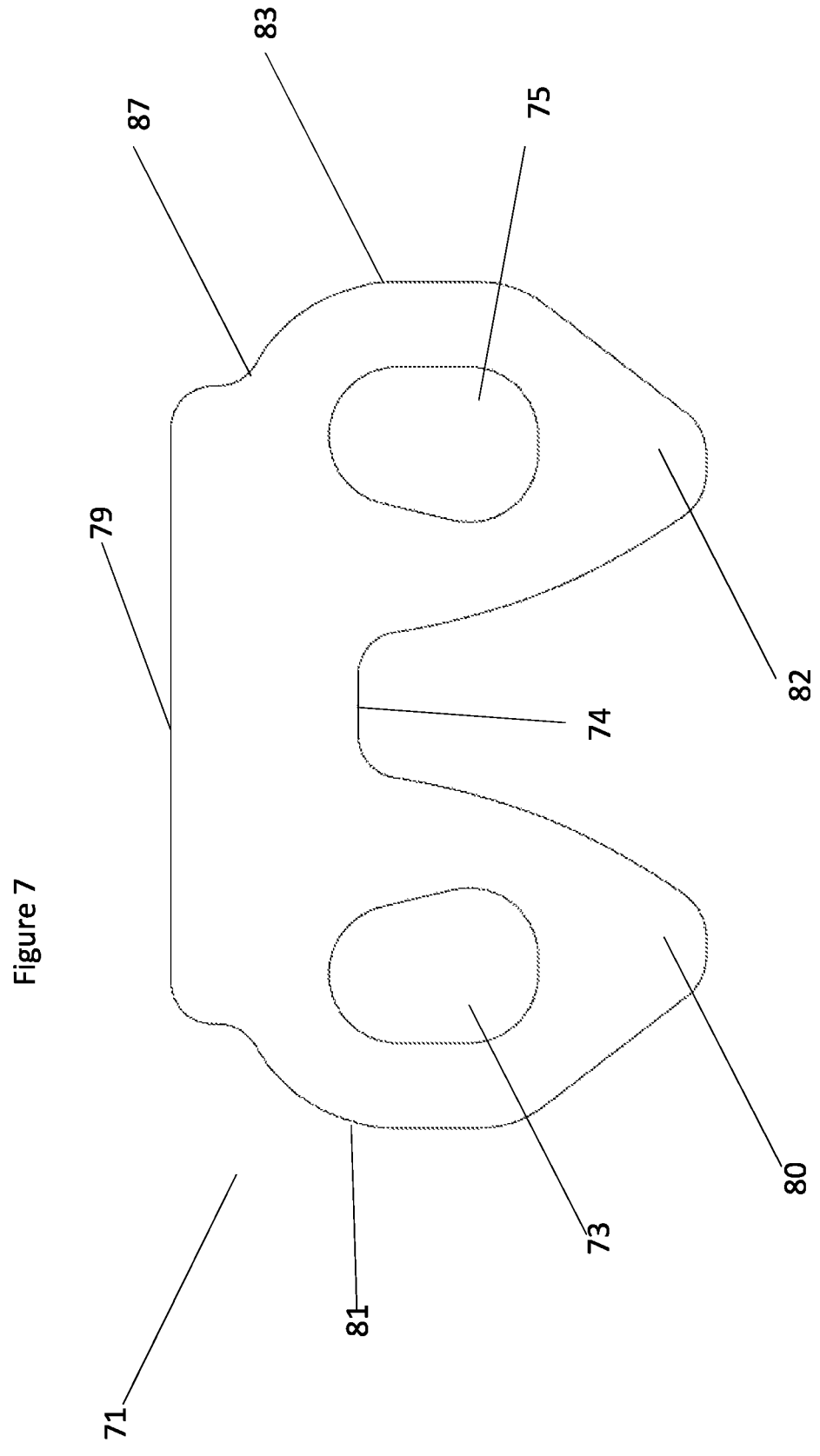
FIG. 7 shows a cross sectional view of a link according to a fourth embodiment comprising a first aperture, a second aperture, and a crotch element, with a top edge. The link shown is configured for use with a single pin in each aperture.

FIG. 7 shows a cross sectional view of a link comprising a first aperture, a second aperture, and a crotch element, with a top edge. The link shown is configured for use with a single pin in each aperture. FIG. 7 corresponds to an embodiment of the link. As compared to the embodiment of FIGS. 5 and 6 the shape of the first aperture 73 and the second aperture 75 are different. The shape of the first aperture 73 and the second aperture 75 are the same as the shape of the first aperture 3 and the second aperture 5 of the first embodiment shown in FIGS. 1 and 2. Reference is made to the description of the first aperture 3 and second aperture 5 in relation to FIGS. 1 and 2.

A further difference is that there is no further aperture present in this fourth embodiment. Whilst a further aperture can optionally be added to this embodiment it may be less advantageous. This is because the shape of the first and second apertures, in combination with the crotch element, minimise the shape of the further aperture that may be made without increasing the complexity and cost of manufacture.

This embodiment comprises the top edge 79. This is the same as the top edge in the previous three embodiments described above in relation to FIGS. 1-6. We refer to the earlier description of this feature with respect to these Figures.

Figure 8:
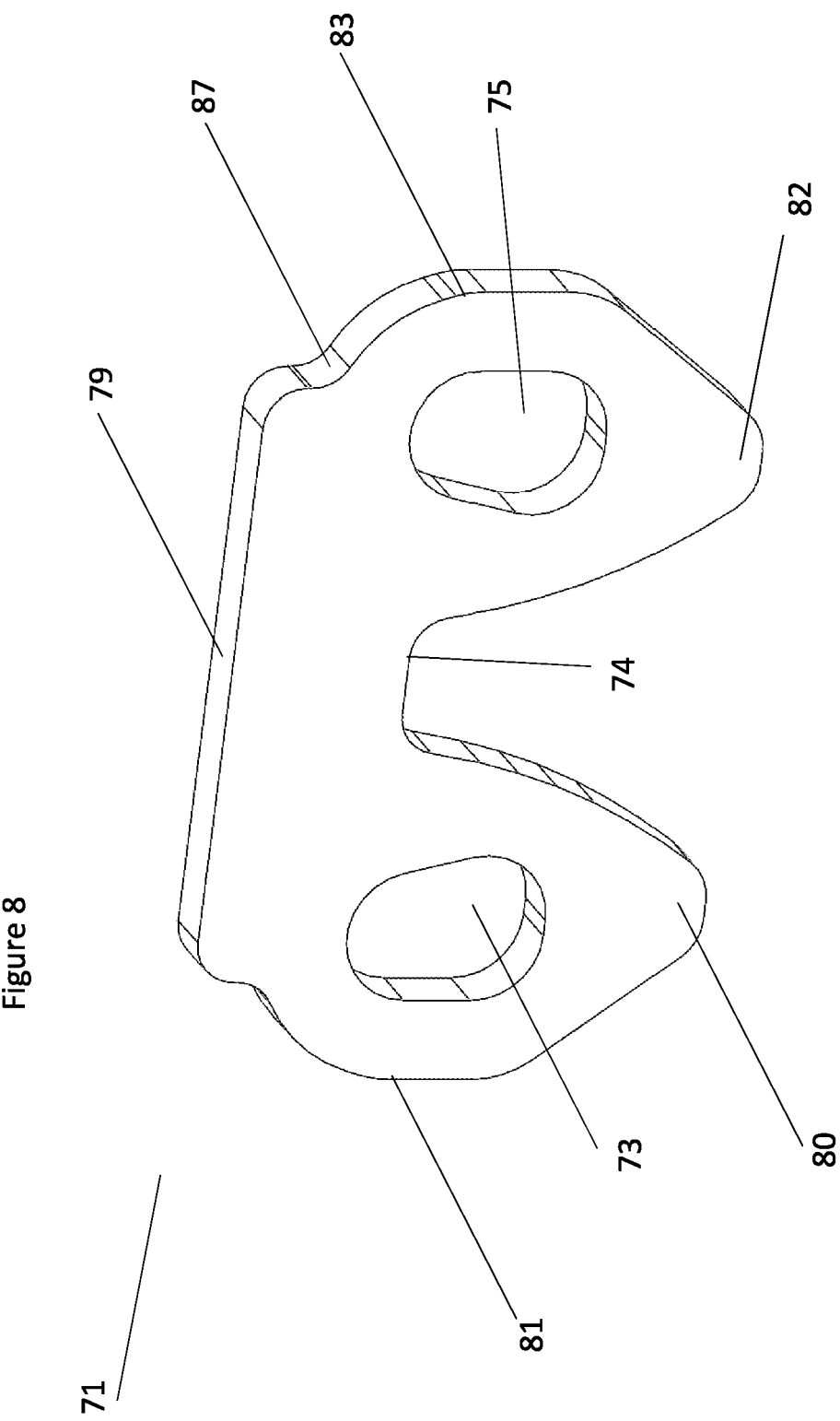
FIG. 8 shows a perspective view of the link according to the fourth embodiment comprising a first aperture, a second aperture, and a crotch element, with a top edge. The link shown is configured for use with a single pin in each aperture.

FIG. 8 shows a perspective view of the link of FIG. 7 comprising a first aperture, a second aperture, and a crotch element, with a top edge. The link shown is configured for use with a single pin in each aperture. FIG. 8 is consistent with the features of FIG. 7.

Figure 9:
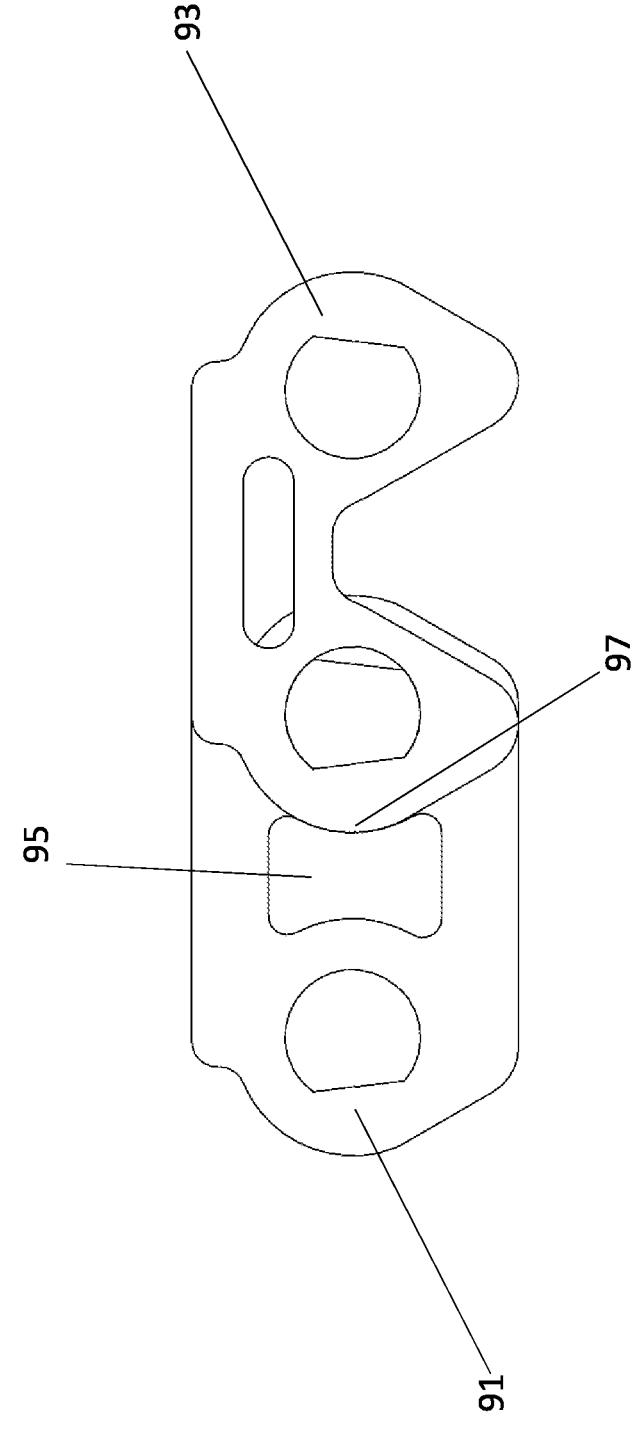
FIG. 9 shows two links adjacent to one another, as they are during use.

FIG. 9 shows two links adjacent to one another, as they are during use. In FIG. 9 the links are parallel with one another.

FIG. 9 shows a first link 91, and a second link 93. The first link 91 comprises a further aperture 95. The second link 93 comprises a first side 97. The first side 97 is bulbous in this embodiment.

FIG. 9 shows the first link as a guide link (as shown in the first and second embodiments illustrated and described with reference to FIGS. 1-4). FIG. 9 shows the second link as a plain link (as shown in the third and fourth embodiments illustrated and described with reference to FIGS. 5-8). It is noted however that both the first link 91 and the second link 93 may be either a guide link or a plain link, and that only one of the first link 91 and the second link 93 need contain a further aperture 95. Embodiments that do not contain a further aperture are covered by aspects of the invention, but this Figure illustrates a feature that comprises a further aperture being present. Typically, both the first link and the second link will both be single pin or double pin, rather than a combination—however such combinations may be put into practice in specific use cases if required.

In FIG. 9 the first side 93 of the second link 93 has the same shape/radius as the second side of the further aperture 95 of the first link 91. Therefore, in situ adjacent one another (as they would be in a conveyor belt/chain that is lying flat) there is no overlap of the bulbous side 97 across the further aperture 95. In other embodiments there may be a limited amount of overlap, but this overlap is nonetheless reduced. Although not shown a double pin (or single pin in alternate embodiments) lies through the first aperture of the second link 93 and the second aperture of the first link 91.

Figure 10:
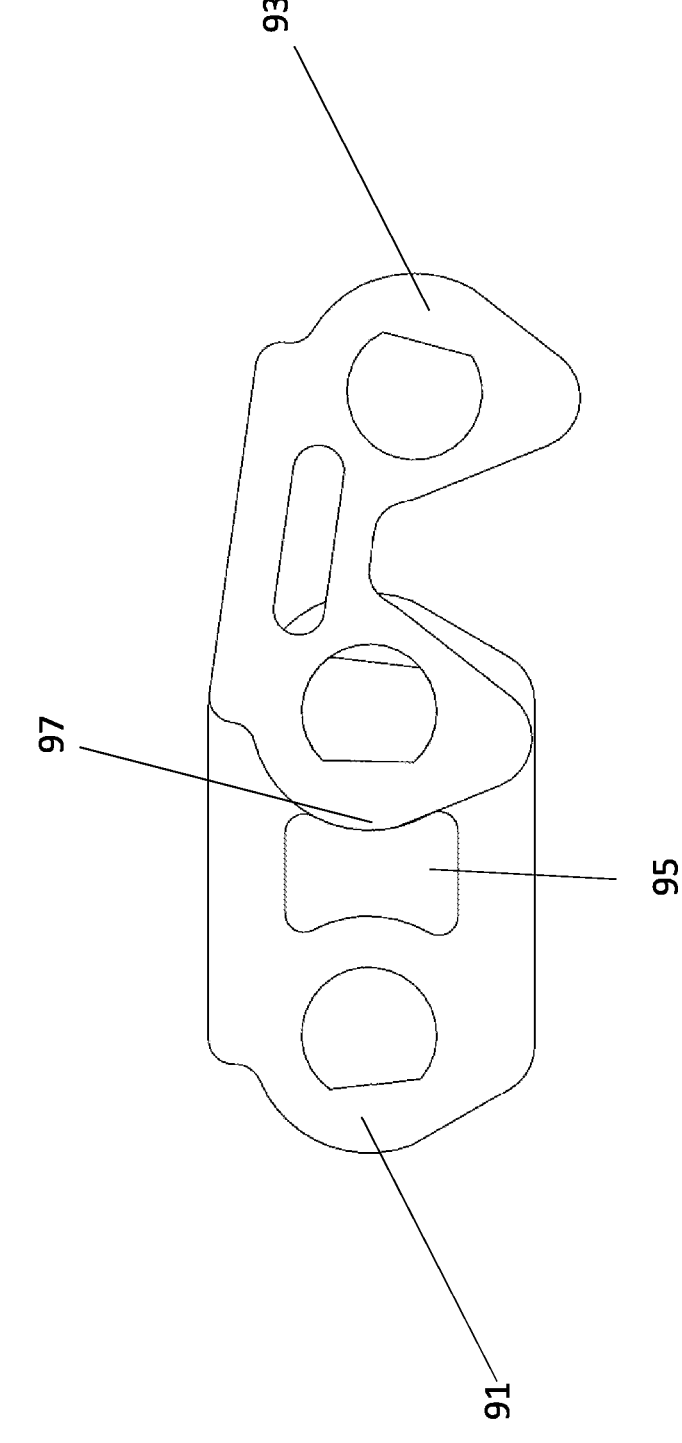
FIG. 10 shows two links adjacent one another, as they are during use.

FIG. 10 shows two links adjacent one another, as they are during use. In FIG. 10 the links are pivoted such that the right-most link is rotated clockwise about the common aperture. In use the second link 93 may be pivoted anti-clockwise relative to the first link 91. In use this pivoting is unlikely to be more than the angle shown in FIG. 10—approximately 30 degrees. Within this angular range no portion of the second link 93 (including the edge 97) overlaps or impinges the further aperture 95 of the first link 91.

Figure 11:
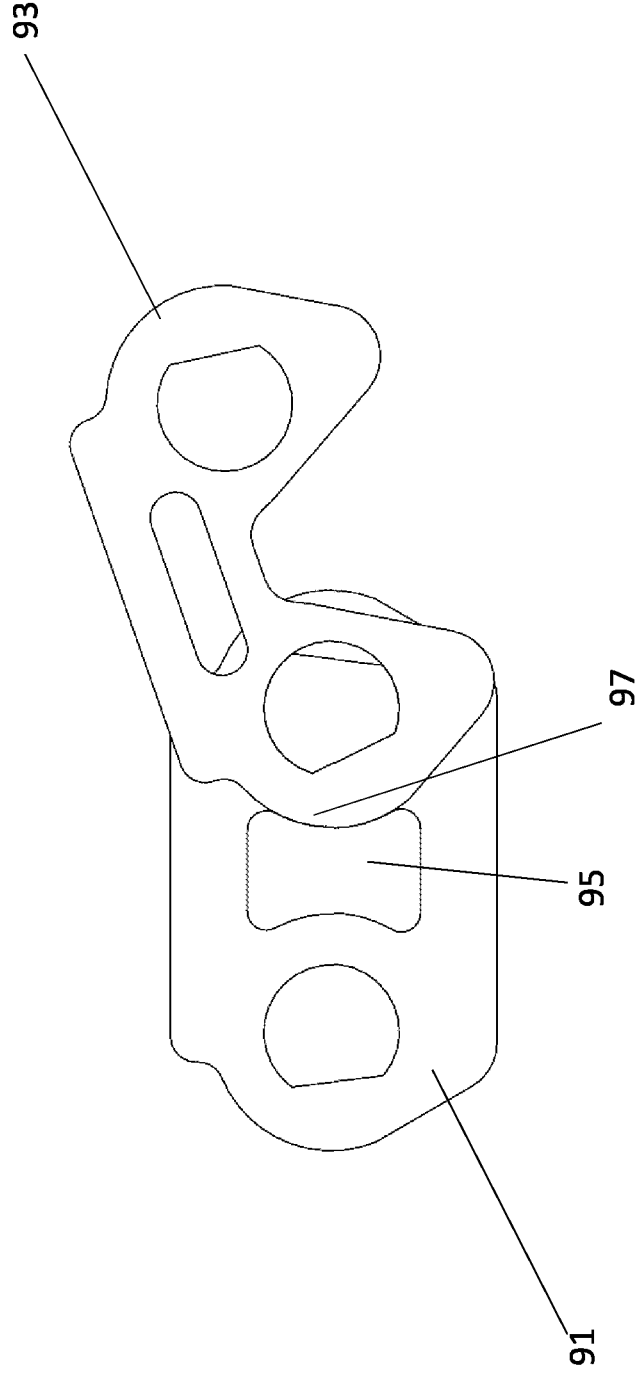
FIG. 11 shows two links adjacent one another, as they are during use.

FIG. 11 shows two links adjacent one another, as they are during use. In FIG. 11 the links are pivoted such that the right-most link is rotated anti-clockwise about the common aperture. In use the second link 93 may be pivoted clockwise relative to the first link 91. In use this pivoting is unlikely to be more than the angle shown in FIG. 10—approximately 30 degrees. Within this angular range no portion of the second link 93 (including the edge 97) overlaps or impinges the further aperture 95 of the first link 91.

Figure 12:
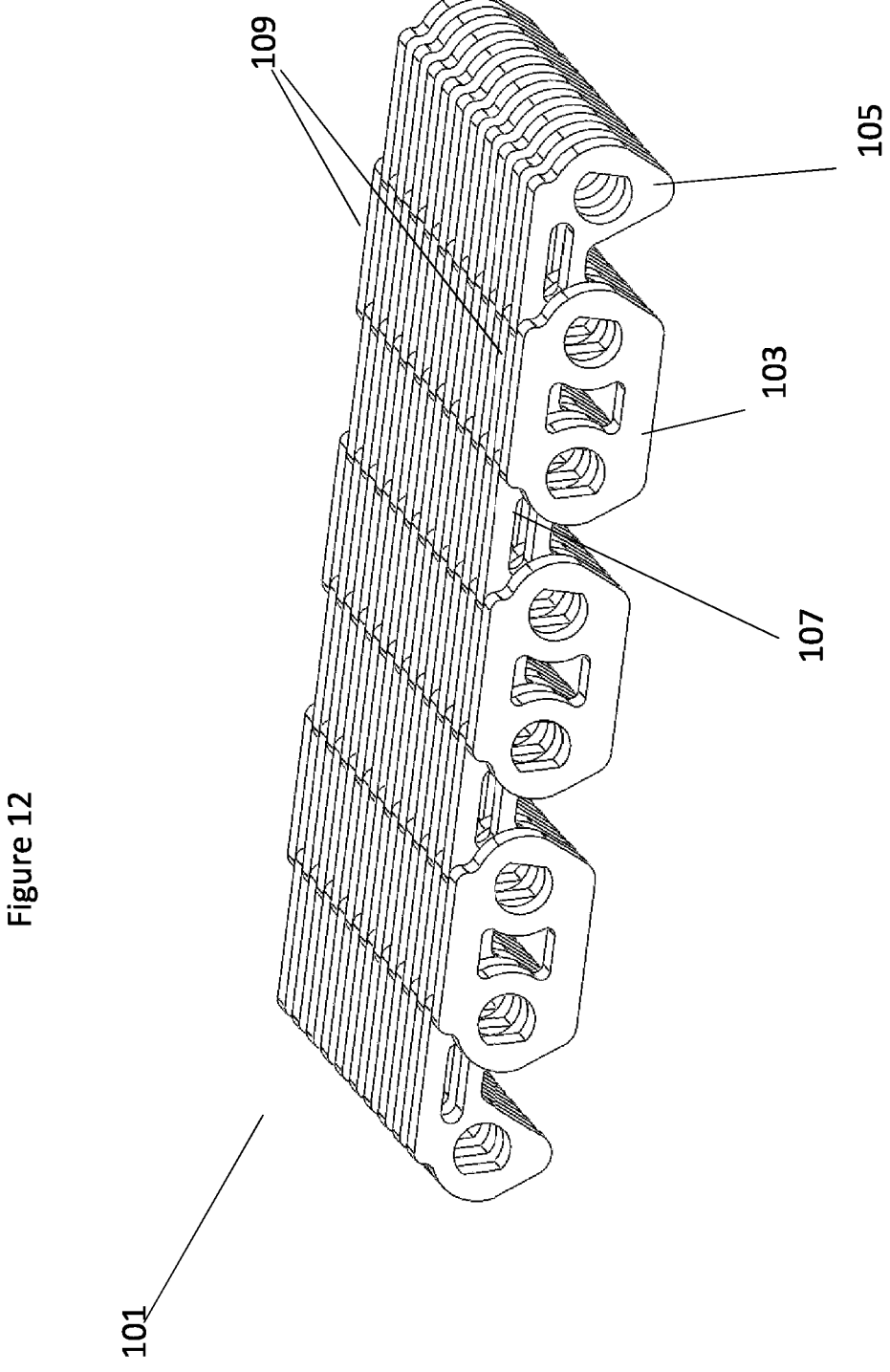
FIG. 12 shows a multi-link conveyor chain formed from the links described above.

FIG. 12 shows a multi-link conveyor chain formed from the links described above. The multi-link conveyor chain comprises a first link 103, a second link 105, a third link 107, and a fourth link 109. Reference numeral 109 points to two links—but any link that is directly behind the first link 103 may be considered the fourth link 109. In particular, the link directly behind the first link, second link, and third link is highlighted, as is the link at the back of the chain (as this is the simplest to see for the purpose of clarity).

The pins are not shown—but the links shown are double pin links. Therefore, in this embodiment two pins are configured to pass through the first aperture of the first link, and the second aperture of the second link. The pins that pass through the first aperture of the first link 103, pass through the second aperture of the second link 105. The pins that pass through the second aperture of the first link 103 pass through the first aperture of the third link 107. The pins that pass through the first aperture of the first link 103 pass through the first aperture of the fourth link 109. The pins that pass through the second aperture of the first link 103 pass through the second aperture of the fourth link 109.

It is noted that any spacers, or other elements may be used in combination with the links and pins described. Moreover, said spacers or other elements may be situated in-between the links described.

Additional pins and links may be used, as shown in FIG. 12. There may be end plates at the end of the pins. Additionally/alternatively the pins may be welded or otherwise attached to the most peripheral links in the chain. Additional pins are parallel with the first and second pins (or sets of pins as the case for double pin embodiments). Along each pin the links are arranged as described above. This creates a two-dimensional mesh of links across the pins such that a belt/chain is formed as shown in FIG. 12.

The conveyor chain described above may be used by providing a force to translate a portion of the conveyor, said translation causing the first link and the second link to pivot relative to one another about the first pin, wherein no portion of the first link overlaps the further aperture of the second link, and no portion of the second link overlaps the further aperture of the first link.

A conveying system comprising the multi-link conveyor chain described above may be utilised. This conveying system may form at least a portion of a glass production system.

The above embodiments are to be understood as illustrative examples. Further embodiments are also envisaged. It is to be understood that any feature described in relation to any one embodiment may be used alone, or in combination with other features described and may also be used in combination with one or more features of any other of the embodiments, or any combination of any other of the embodiments.

Furthermore, equivalents and modifications not described above may also be employed without departing from the scope of the invention, which is defined in the accompanying claims.

In some examples, one or more memory elements can store data and/or program instructions used to implement manufacture of products, or use of the products, described herein. Embodiments of the disclosure provide tangible, non-transitory storage media comprising program instructions operable to program a processor to said manufacture method or use method and/or claimed herein.

The processor of such use/manufacturing apparatus, such as a processor in a link manufacturing facility, or a processor at a glass production facility (and any of the methods, activities or instructions outlined herein) may be implemented with fixed logic such as assemblies of logic gates or programmable logic such as software and/or computer program instructions executed by a processor. Other kinds of programmable logic include programmable processors, programmable digital logic (e.g. a field programmable gate array (FPGA), an erasable programmable read only memory (EPROM), an electrically erasable programmable read only memory (EEPROM), an application specific integrated circuit (ASIC) or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. Such data storage media may also provide the data storage of the manufacturing device.

The invention claimed is:

1. A toothed link for use in a multi-link conveyor chain, the toothed link comprising:
    a link body having a first aperture and a second aperture that are configured to house a first pin and a second pin, respectively; and
    a top edge,
    wherein the link body further comprises an additional aperture that is positioned closer to the first aperture and the second aperture than to the top edge,
    wherein said additional aperture is spaced from the first and second apertures by a spacing of at least 2 mm, and said additional aperture is spaced from the top edge by a spacing of at least 3 mm, and
    wherein a combination of said respective spacings is configured to maintain a maximal strength of the toothed link with the addition of said additional aperture.

2. The toothed link of claim 1, wherein the additional aperture is positioned in between the first aperture and the second aperture.

3. The toothed link of claim 1, wherein an edge of the additional aperture that is closest to the first aperture is curved such that the distance between the additional aperture and the first aperture is approximately constant.

4. The toothed link of claim 1, wherein said additional aperture is spaced from the first and second apertures by a distance that is equal to a thickness of the link.

5. The toothed link of claim 1, wherein the link body further comprises a first leg and a second leg, the first leg and the second leg connected by a crotch element, wherein the first and second legs are configured to engage with a drive sprocket of a conveyor system.

6. The toothed link of claim 1, wherein the additional aperture is a different shape that the first aperture.

7. The toothed link of claim 1, wherein the additional aperture is at least 3 mm in length.

8. The toothed link of claim 1, wherein the additional aperture is at least 2 mm in depth.

9. The toothed link of claim 1, wherein the first aperture extends more proximally than a proximal end of the top edge.

10. The toothed link of claim 1, wherein the toothed link is an inverted tooth link.

11. The toothed link of claim 1, wherein the toothed link comprises at least one of a stainless steel and a carbon steel.

12. A multi-link conveyor chain comprising:

a first pin that protrudes through a first aperture of a first link; and a second pin that extends in parallel with the first pin and that protrudes through a second aperture of the first link;

wherein the first pin protrudes through a second aperture of a second link, wherein the second pin protrudes through a first aperture of a third link, wherein the second link is adjacent to the third link, wherein the first pin protrudes through a first aperture of a fourth link, wherein the second pin protrudes through a second aperture of the fourth link, wherein the second link and third link are located between the first link and the fourth link, and wherein at least one of the first, second, third or fourth links comprise the tooted link in accordance with claim 1.

13. The multi-link conveyor chain of claim 12, wherein the first link and the second link are configured to pivot relative to one another about the first pin.

14. The multi-link conveyor chain of claim 13, wherein, when pivoted relative to one another, a bulbous side of a first side of the first link does not overlap the additional aperture of the second link.

15. The multi-link conveyor chain of claim 14, wherein, when pivoted relative to one another, a raised lip connecting the bulbous side to the top edge of the first link does not overlap the additional aperture of the second link.

16. The multi-link conveyor chain of claim 13, wherein the chain is configured for glass production.

17. A toothed link for use in a multi-link conveyor chain, the link comprising:

a link body having a first aperture and a second aperture that are configured to house a first pin and a second pin, respectively; and a top edge that is connected to the link body via a raised lip;

wherein a first side and a second side of the link body are bulbous, and the raised lip connects external sides of the bulbous body with the top edge, wherein the raised lip comprises a localized increase in a gradient of a perimeter of the toothed link connecting the external sides of the bulbous body with the top edge, and wherein a portion of the perimeter of the toothed link comprising the raised lip comprises at least two distinct positive gradient values.

18. The toothed link of claim 17, wherein the raised lip is at least 1 mm in depth.

19. The toothed link of claim 17, wherein the raised lip increases the contact surface of the top edge by at least 5%.

* * * * *